United States Patent [19]
Kabout

[11] Patent Number: 5,712,516
[45] Date of Patent: Jan. 27, 1998

[54] STATOR-ELEMENT FOR A LINEAR-ELECTRICAL-DRIVE DOOR PROVIDED WITH A STATOR-ELEMENT AS SUCH

[75] Inventor: Wim Kabout, Huizen, Netherlands

[73] Assignee: Stator B.V., Zaltbommel, Netherlands

[21] Appl. No.: 436,325

[22] PCT Filed: Nov. 25, 1993

[86] PCT No.: PCT/NL93/00251

§ 371 Date: Jun. 26, 1995

§ 102(e) Date: Jun. 26, 1995

[87] PCT Pub. No.: WO94/13055

PCT Pub. Date: Jun. 9, 1994

[30] Foreign Application Priority Data

Nov. 26, 1992 [NL] Netherlands ............... 9202053

[51] Int. Cl.$^6$ .......................... H02K 41/02; E05F 15/18
[52] U.S. Cl. .......................... 310/12; 49/360
[58] Field of Search .................... 310/12, 13, 14, 310/51; 49/360, 404, 118, 139

[56] References Cited

U.S. PATENT DOCUMENTS

| | | | |
|---|---|---|---|
| 1,916,491 | 7/1933 | Rose | 310/13 |
| 3,413,759 | 12/1968 | Henry-Baudot | 49/360 |
| 5,175,455 | 12/1992 | Penicaut | 310/12 |
| 5,247,763 | 9/1993 | Hein | 49/31 |
| 5,302,873 | 4/1994 | Takei | 310/12 |

FOREIGN PATENT DOCUMENTS

| | | |
|---|---|---|
| 2208225 | 11/1973 | France . |
| 40 40 116 | 6/1992 | Germany . |
| 61-15556 | 1/1986 | Japan . |

OTHER PUBLICATIONS

"*Patent Abstracts of Japan*", The Japanese Office Japanese Government—vol. 10, No. 164 (Jun. 11, 1986).

*Primary Examiner*—Steven L. Stephan
*Assistant Examiner*—Judson H. Jones
*Attorney, Agent, or Firm*—Wells, St. John, Roberts, Gregory & Matkin, P.S.

[57] ABSTRACT

Stator element for a linear-electric-drive of a body reciprocally slidable over a limited length in a straight or curved line, such as a door, gate or carriage, provided with a magnet or magetizable counter element, which stator is provided with an elongate holder, a number of rod-like, mutually parallel and adjacent carriers fixed transversely onto the holder and a number of windings each of which is wound in each case around at least one carrier along a side of the holder, which winding is connected onto a controlled voltage source so that accurate speed control of the body for moving can be obtained.

18 Claims, 1 Drawing Sheet

STATOR-ELEMENT FOR A LINEAR-ELECTRICAL-DRIVE DOOR PROVIDED WITH A STATOR-ELEMENT AS SUCH

TECHNICAL FIELD

The invention relates to a stator element for linear-electrical-driving of a body reciprocally slidable over a limited length in a straight or curved line, such as a door, gate or carriage, provided with a magnet or magnetizable counter element.

Background of the Invention

Linear drive techniques are generally known and serve mainly for the driving of a body along a rail, such as trains and the like. The invention relates particularly to linear driving of bodies which are moved reciprocally over a limited length, for instance a sliding door. This is associated with the problem that the control of the linear drive motor must be such that the movement of the body proceeds smoothly and the end positions are accurately defined. Furthermore, the drive must be safe and easy to operate.

SUMMARY OF THE INVENTION

The stator element according to the invention is distinguished by an elongate holder, a number of rod-like, mutually parallel and adjacent carriers fixed transversely onto the holder and a number of windings each of which is trained in each case round at least one carrier along a side of the holder, which winding is connected onto a controlled voltage source.

Due to the controlled voltage source each winding in the stator element can be actuated separately and therefore the correct magnetic field generated in order to move the magnetizable counter element and the body connected thereto, wherein the control is such that overlapping magnetic fields can be generated to obtain a smooth movement. The end positions are accurately defined by opposite actuation of the magnetic fields so that the movement is braked at the ends.

A more precise control of the movement can be obtained according to the invention in that each winding is trained in each case round two carriers and two separately powered windings overlap one another. It is hereby possible to obtain overlapping magnetic fields.

The invention further relates to a sliding door consisting of a door panel, a series or permanent magnets arranged on the top edge of the panel and a guide strip of magnet-sensitive material arranged on the upper side of the door recess, this such that the door panel is suspended from the recess by means of the magnet action and is slidable reciprocally along the strip, which according to the invention is provided with a stator element as described above.

Above mentioned and other features of the invention will be elucidated hereinbelow with reference to an embodiment in the form of a sliding door.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

Figure 1:
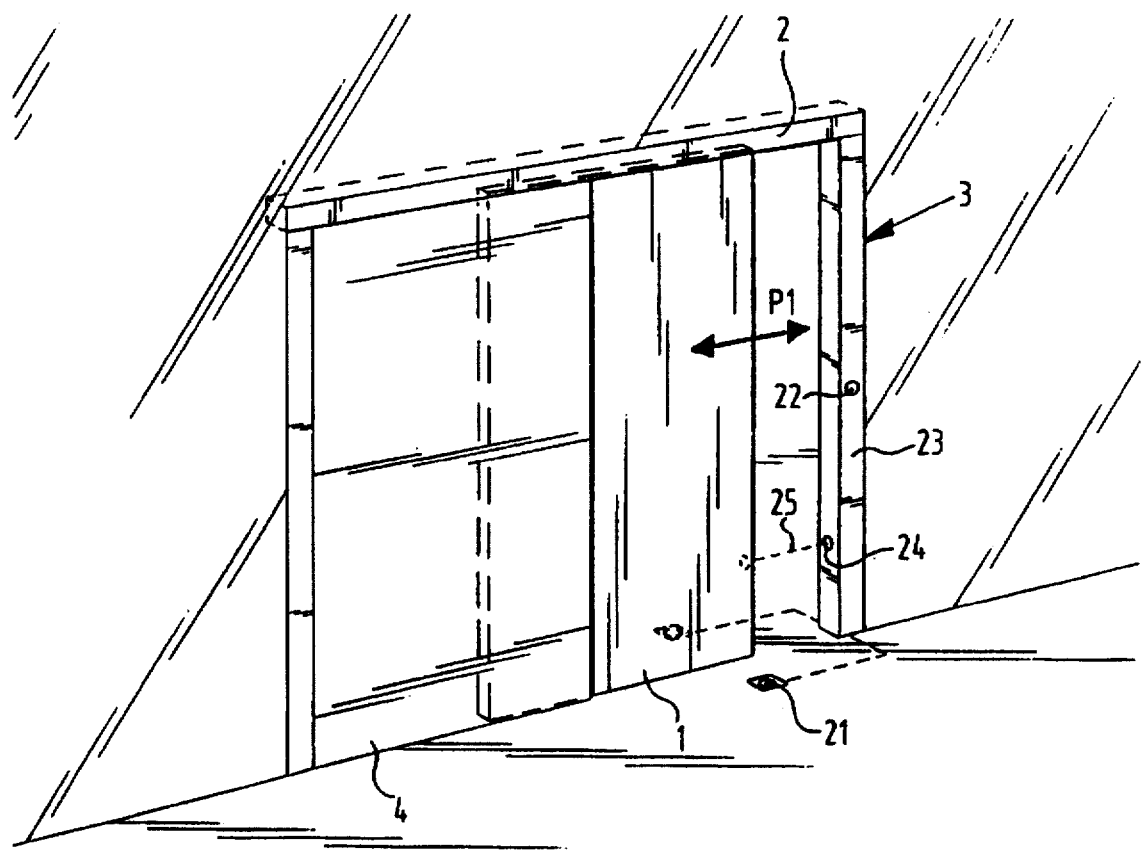
FIG. 1 shows a perspective view of a sliding door which is suspended by means of magnets from the lintel of a frame and which can be moved reciprocally by means of a linear drive according to the invention.

This disclosure of the invention is submitted in furtherance of the constitutional purposes of the U.S. Patent Laws "to promote the progress of science and useful arts" (Article 1, Section 8).

Designated in the drawings with the numeral 1 is a door panel which is for instance suspended at the top from a lintel 2 of a frame 3 which is placed in a random building, outer wall etc. The frame is embodied partly as a housing 4 in which the door panel can be received. The door is movable reciprocally in the direction of arrow P1.

Suspension of the door panel 1 can take place for instance by arranging a number, or series, of magnets or magnet-groups 10, the magnetic field strength of which is such that an attractive force is obtained to the guide plate 11 arranged on the underside of lintel 2. The attractive force is sufficient to lift the weight of door panel 1. Arranged at the ends of the magnet groups is a guide wheel 12 which runs in a guide 14 on the underside of strip 11. In order to enable reciprocal movement of door panel 1 in the direction of the arrow P1 a stator element 15 is arranged above guide strip 11. This stator element consists of an elongate holder 16 on the underside of which a number of carriers 17 are arranged in transverse direction. Both the elongate holder 16 and the carriers 17 are made of a metal. A winding 18 is arranged around each carrier such that a portion of the winding runs along the upper side of the carriers 17 and the remaining portion below the elongate holder 16. Thus result torus-shaped windings which are each actuated separately by a voltage. This voltage can be alternating voltage, for instance block-voltage (coils being supplied with either a nil voltage or a predetermined maximum voltage only), and is controlled by an electronic control (not shown) such that each winding can be actuated separately with a determined voltage value and time duration.

Figure 2:
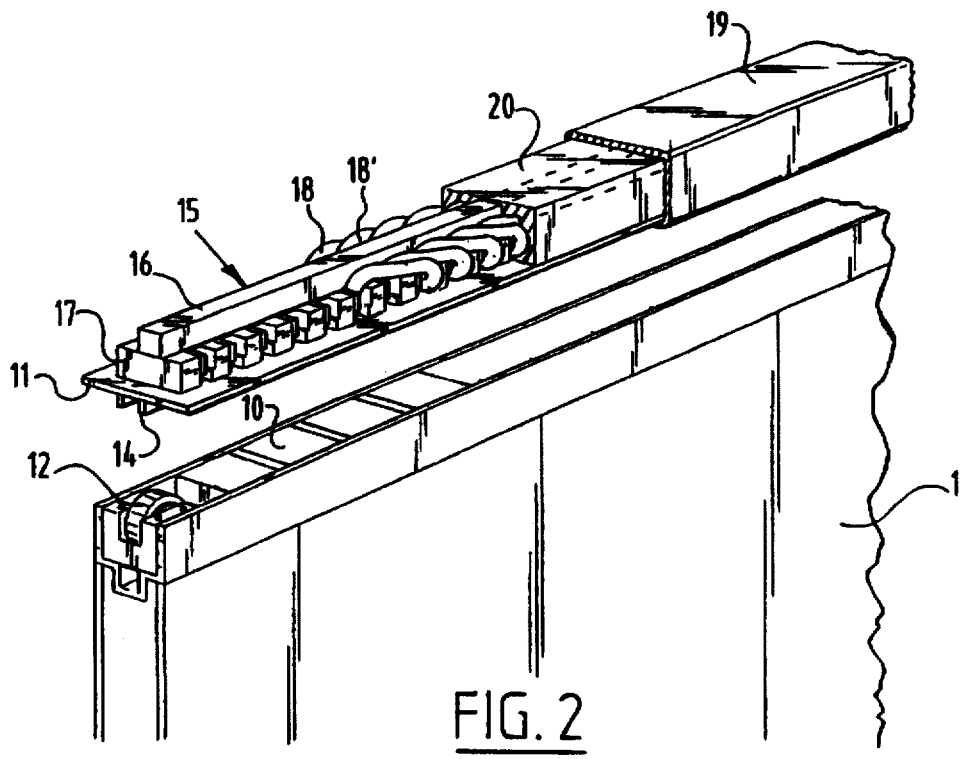
FIG. 2 is a perspective view of a detail of the stator element with the upper part of the door of FIG. 1.

The embodiment depicted in FIG. 2 shows that in each case a torus-shaped winding is trained over two carriers 17, wherein the adjacent windings can mutually overlap, see winding 18'.

The whole stator (or stator element), that is, holder with carriers and windings fixed thereto, is received in a profile 19 which is wholly filled with a resin 20.

Control of stator element 15 can be augmented with switches for operation by the user. These can be foot switches 21, see FIG. 1, approach switches 22 (switches that are activated by presence of an approaching user proximate the suspended door, either by manual triggering by a user or by detection of the presence of the user) and any other suitable switch, for instance remote controlled. For safety purposes a detection sensor 24, for instance in the form of a light-sensitive sensor, can be arranged on the inside of the standing moulding 23 of frame 3, wherein the drive is stopped immediately through interruption of the light ray 25. Interruption can be caused by the passage of objects or people.

The invention is not limited to the above described embodiment. It is for instance possible to embody the stator element in a curved line, whereby the counter element moves as according to this curved line and the body can turn in a circle.

I claim:

1. In an assembly of a stator element and a cooperating counter element for linear-electrical-driving of a body reciprocally slidable over a limited length in a straight or curved line, such as a door, gate or carriage, the body being provided with the cooperating counter element, the improvement comprising a stator element having an elongate holder, a number of rod-like, mutually parallel and adjacent carriers fixed transversely onto the holder and a number of windings, each of which is trained in each case around at least one carrier along a side of the holder, each of the windings is connected onto a controlled voltage source, the counter element is embodied as an elongate group of blocks, each formed from a magnet of magnetizable material.

2. The assembly as claimed in claim 1, wherein each winding is trained in each case around two carriers and two separately powered windings overlap one another.

3. The assembly as claimed in claim 1, wherein a power supply of the controlled voltage source for each winding in the stator element is a block-voltage.

4. In a sliding door having a door panel, a series of permanent magnets arranged on the top edge of the panel and a guide strip of magnet-sensitive material arranged on a lintel of a door frame, this such that the door panel is suspended from the lintel by means of the magnet action and is slidable reciprocally along the strip, the improvement comprising:

an assembly of a stator element and a cooperating counter element for linear-electrical-driving of a body reciprocally slidable over a limited length in a straight or curved line, such as a door, gate or carriage, the series of permanent magnets providing at least in part the counter element, the body being provided with the cooperating counter element, the stator element comprising an elongate holder, a number of rod-like, mutually parallel and adjacent carriers fixed transversely onto the holder and a number of windings, each of which is trained in each case around at least one carrier along a side of the holder, each of the windings is connected onto a controlled voltage source, and the counter element is embodied as an elongate group of separate magnets of magnetizable material, wherein the guide strip is fixedly mounted in relation with the stator element, interposed between the permanent magnets and the stator element.

5. The sliding door as claimed in claim 4 wherein the magnets are disposed transversely of the sliding direction.

6. The sliding door as claimed in claim 4, wherein the magnets are arranged in groups, which groups are arranged at a mutual distance as seen in the sliding direction.

7. The sliding door as claimed in claim 4, wherein the magnets are arranged in the groups with alternating north and south poles.

8. The sliding door as claimed in claim 4, wherein on either side of the permanent magnets a travel wheel is arranged on the upper side of the door.

9. The stator element as claimed in claim 2, wherein a power supply of the controlled voltage source for each winding in the stator element is a block-voltage.

10. The sliding door as claimed in claim 5, wherein the magnets are arranged in groups, which groups are arranged at a mutual distance as seen in the sliding direction.

11. The sliding door as claimed in claim 5, wherein the magnets are arranged in the group with alternating north and south poles.

12. The sliding door as claimed in claim 6, wherein the magnets are arranged in the group with alternating north and south poles.

13. The sliding door as claimed in claim 5, wherein on either side of the permanent magnets a travel wheel is arranged on the upper side of the door.

14. The sliding door as claimed in claim 6, wherein on either side of the permanent magnets a travel wheel is arranged on the upper side of the door.

15. The sliding door as claimed in claim 7, wherein on either side of the permanent magnets a travel wheel is arranged on the upper side of the door.

16. An assembly of a stator element and a cooperating counter element for linear-electrical-driving of a body reciprocally slidable over a limited length in a straight or curved line, such as a door, gate or carriage, comprising:

a body carrying a cooperating counter element; and a stator element comprising an elongate holder, a number of rod-like, mutually parallel and adjacent carriers fixed transversely onto the holder and a number of windings, each of which is trained in each case around at least one carrier along a side of the holder, each of the windings being connected onto a controlled voltage source, the counter element being embodied as an elongate group of blocks, each formed from a magnet of magnetizable material.

17. The sliding door as claimed in claim 4, wherein on each side of the series of permanent magnets a travel wheel is arranged on the upper side of the door.

18. The sliding door as claimed in claim 5, wherein on each side of the series of permanent magnets a travel wheel is arranged on the upper side of the door.

* * * * *